United States Patent
Struik

(10) Patent No.: US 9,207,738 B2
(45) Date of Patent: Dec. 8, 2015

(54) DATA PROCESSING DEVICE WITH ADJUSTABLE PERFORMANCE LEVEL AND METHOD OF OPERATING SUCH DEVICE

(75) Inventor: Pieter Struik, Nuenen (NL)

(73) Assignee: ST-Ericsson SA, Plan-les-Ouates (CH)

( * ) Notice: Subject to any disclaimer, the term of this patent is extended or adjusted under 35 U.S.C. 154(b) by 1342 days.

(21) Appl. No.: 12/735,905

(22) PCT Filed: Feb. 25, 2009

(86) PCT No.: PCT/EP2009/052218
§ 371 (c)(1),
(2), (4) Date: Feb. 25, 2011

(87) PCT Pub. No.: WO2009/106540
PCT Pub. Date: Sep. 3, 2009

(65) Prior Publication Data
US 2011/0145554 A1    Jun. 16, 2011

(30) Foreign Application Priority Data

Feb. 25, 2008    (EP) .................................. 08101962

(51) Int. Cl.
*G06F 1/32* (2006.01)
(52) U.S. Cl.
CPC .............. *G06F 1/3203* (2013.01); *G06F 1/324* (2013.01); *G06F 1/3296* (2013.01); *Y02B 60/1217* (2013.01); *Y02B 60/1285* (2013.01)
(58) Field of Classification Search
CPC .................................................... G06F 1/3203
See application file for complete search history.

(56) References Cited

U.S. PATENT DOCUMENTS

| | | | |
|---|---|---|---|
| 5,878,208 A * | 3/1999 | Levine et al. | 714/38.13 |
| 6,564,328 B1 | 5/2003 | Grochowski et al. | |
| 7,111,179 B1 | 9/2006 | Girson et al. | |
| 7,240,223 B2 | 7/2007 | de Cesare et al. | |
| 2006/0047987 A1 | 3/2006 | Prabhakaran et al. | |
| 2006/0259621 A1* | 11/2006 | Ranganathan et al. | 709/226 |
| 2009/0125293 A1* | 5/2009 | Lefurgy et al. | 703/18 |

FOREIGN PATENT DOCUMENTS

| | | |
|---|---|---|
| CN | 1434934 A | 8/2003 |
| CN | 1784646 A | 6/2006 |
| WO | 2004044720 A2 | 5/2004 |

(Continued)

OTHER PUBLICATIONS

International Search Report dated Jun. 22, 2009 in connection with PCT Patent Application No. PCT/EP2009/052218.
Written Opinion of the International Searching Authority dated Jun. 22, 2009 in connection with PCT Patent Application No. PCT/EP2009/052218.

(Continued)

*Primary Examiner* — Andrew Caldwell
*Assistant Examiner* — John Lindlof
(74) *Attorney, Agent, or Firm* — Coats & Bennett, PLLC

(57) ABSTRACT

A data processing device has a processor (10) operable at selectable ones of a plurality of performance levels. The processor generates a workload data vector indicating a workload of the processor as a function of time. A memory stores a set of reference workload vectors. A pattern matcher (18) detects whether there is a matching reference workload data vector. A performance level controller (19) selects the performance level of the processor based on control information that is stored in combination with the matching workload data vector.

19 Claims, 3 Drawing Sheets

(56) References Cited

FOREIGN PATENT DOCUMENTS

| WO | WO 2004/044720 | A2 | 5/2004 |
| WO | WO 2004/102363 | A2 | 11/2004 |

OTHER PUBLICATIONS

Krisztian Flautner, et al., "Vertigo: Automatic Performance-Setting for Linux", May 17, 2002, p. 1-14.

* cited by examiner

DATA PROCESSING DEVICE WITH ADJUSTABLE PERFORMANCE LEVEL AND METHOD OF OPERATING SUCH DEVICE

CROSS-REFERENCE TO RELATED APPLICATION(S)

The present application claims priority under 35 U.S.C. §365 to International Patent Application No. PCT/EP2009/052218 filed Feb. 25, 2009, entitled "DATA PROCESSING DEVICE WITH ADJUSTABLE PERFORMANCE LEVEL AND METHOD OF OPERATING SUCH DEVICE". International Patent Application No. PCT/EP2009/052218 claims priority under 35 U.S.C. §365 and/or 35 U.S.C. §119(a) to European Patent Application No. 08101962.2 filed Feb. 25, 2008 and which are incorporated herein by reference into the present disclosure as if fully set forth herein.

FIELD OF THE INVENTION

The invention relates to a data processing device and to a method of operating such a device.

BACKGROUND OF THE INVENTION

U.S. Pat. No. 7,194,385 describes a data processing device that reduces power consumption by adapting its performance level dependent on its workload. The performance level may be adapted by changing the power supply voltage and/or clock frequency of the data processing device. In this way reduced power consumption can be realized at the cost of lower performance and vice versa increased performance can be realized at the cost of higher power consumption. However, if performance is reduced too far, this has the effect that time-critical tasks will not be completed in time. Accordingly, it is known to adapt the performance level as a function of time dependent on the tasks that are executed at various times.

U.S. Pat. No. 7,194,385 describes a data processing device wherein the required performance level is predicted using measurements of "work done" during previous time intervals. The "work done" represents the historic workload, that is, the number of instructions that had to be executed by the current tasks during these time intervals. If these tasks do not require much work to be done and the performance level is too high, the data processing device will idle, which does not contribute to work done. U.S. Pat. No. 7,194,385 describes how the performance level can be set so as to handle an average of the previous work done with exponentially decaying weights as the work has been done further in the past.

Unfortunately, the workload of a data processing device can vary irregularly as a function of time. As a result, performance level setting dependent on an average has been found to lead to less than optimal results under some circumstances.

SUMMARY OF THE INVENTION

Among others, it is an object to provide for a data processing device that provides for efficient performance level settings.

A data processing device according to claim 1 is provided. Herein pattern matching is used to detect whether an observed workload pattern of the processor matches a reference workload data vector. If so, pre-stored control information for the matching workload data vector is used to control the performance level of the processor. This makes it possible to handle workload variations that cannot be computed from the current workload pattern.

In an embodiment the pre-stored control information is determined from an observed workload after an earlier occasion when the matching workload data vector also matched the workload pattern of the processor. Thus a dynamic adaptation of the control information is possible. Alternatively, the control information may be preset by a programmer.

BRIEF DESCRIPTION OF THE DRAWINGS

These and other object and advantageous embodiments will become apparent from a description of exemplary embodiments, using the following Figures.

DETAILED DESCRIPTION OF THE DRAWINGS

Figure 1:
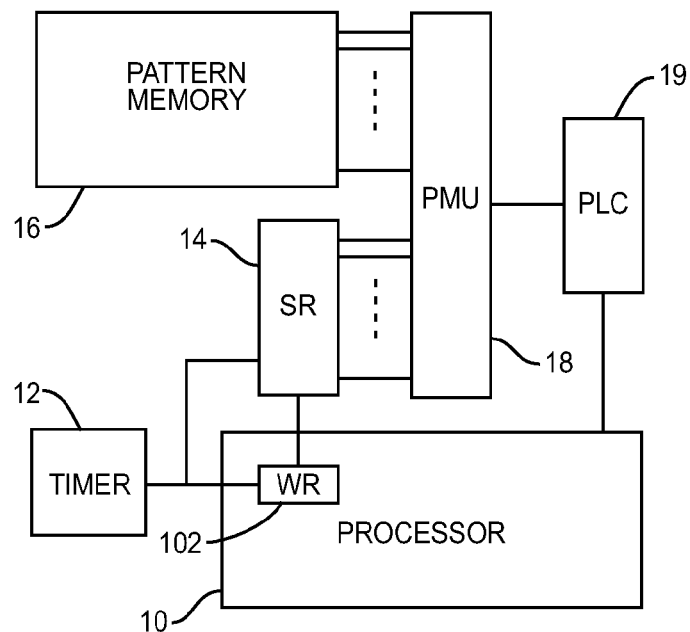
FIG. 1 shows a data processing device

FIG. 1 shows a data processing device, comprising a processor 10, a hardware timer 12, a pattern shift register 14, a pattern memory 16, a pattern matching unit 18, and a performance level controller 19. Processor 10 comprises a workload register 102. Workload register 102 has an output coupled to a data input of pattern shift register 14. Hardware timer 12 has an output coupled to a reset input of workload register 102 and a control input of pattern shift register 14. Pattern matching unit 18 is coupled to an output of pattern shift register 14 and to pattern memory 16. Performance level controller 19 has an input coupled to pattern matching unit 18. Optionally performance level controller 19 has a further input (not shown) coupled to pattern shift register 14. Performance level controller 19 has an output coupled to a performance control input of processor 10.

Although an embodiment is shown wherein a separate pattern shift register 14, pattern memory 16, pattern matching unit 18, and performance level controller 19 are shown, it should be noted that in an alternative embodiment the function of these circuits may be performed equivalently by a task in processor 10.

In operation processor 10 executes programs to perform tasks, operating at a performance level selected under control of the performance control input. Different performance levels may correspond to different combinations of power supply voltage and clock frequency of a processor core (not separately shown) used to perform the instructions of the programs. Typically, the tasks include tasks that have to satisfy real-time requirements to operate without errors. For example, real-time audio and/or video decoding and/or encoding tasks specify successive periodic time points and operate without errors if respective frames of processed data are delivered before respective ones of these time-points. In time periods prior to such time points the performance level must be high enough to realize timely delivery, but in other time periods the performance level may be set lower.

During execution processor 10 regularly updates the content of workload register 102 with increments representing the number of instruction cycles spent on the tasks, not counting cycles of idle time. Hardware timer 12 defines sampling periods. Hardware timer 12 periodically causes workload data based on a sample of the content of workload register 102 to be shifted into pattern shift register 14 and subsequently causes the content of workload register 102 to be reset. This is done for example every X milliseconds, with X in a range between 3-10 milliseconds for example. As will be appreciated the duration of these time intervals for which the samples are taken is much larger (e.g. more than a thousand times larger) than the duration needed to execute an individual instruction. Thus, a vector of successive samples forms an average program signature (also called code signature) for the general behavior of a program, rather than for individual instructions.

In an embodiment, the content of workload register 102 may be quantized (e.g. rounded to a nearest one of a number of predetermined values) before delivery as workload data to pattern shift register 14. For this purpose a quantizer (not shown) may be included between workload register 102 and pattern shift register 14 (alternatively, a quantizer may be included between pattern shift register 14 and pattern matching unit 18). Pattern shift register 14 shifts previous workload data when a new sample is shifted in. Thus, a workload pattern, also called code signature, is obtained that is representative of the program (code) that is executed.

Pattern memory 16 stores a set of reference workload data vectors, each workload data vector in combination with control information. Each workload data vector contains a plurality of N (N=8 for example) samples of workload data. The control information serves to control a performance level of processor 10. The control information may for example be a performance value to be used in the next sampling period. Alternatively the control information may be a workload value that can be used as a prediction for the workload of a next sampling period, in which case performance level controller 19 computes a performance level from the workload represented by the control information. In an embodiment the workload data vectors and control information in pattern memory 16 may be updated dynamically, as will be described in the following. With dynamic adjustment, an observed workload after occurrence of a workload data vector is used to set the performance level after a subsequent occurrence of a workload data vector. In another embodiment a programmer may prepare predetermined workload data vectors and control information and store these in pattern memory 16.

Pattern shift register 14 and pattern matching unit 18 form a pattern matcher. Pattern shift register 14 applies a current workload data vector with successive workload data values form a series of previous sampling periods to pattern matching unit 18. Pattern matching unit 18 searches pattern memory 16 for a reference workload data vector that matches the current workload data vector from pattern shift register 18 and if a matching workload data vector is found among the reference workload data vectors, pattern matching unit 18 outputs the control information that is combined with the matching workload data vector. Performance level controller 19 uses the control information to generate a performance control signal for processor 10.

If no matching workload data vector is found, this may be signalled to performance level controller 19, which then sets the next performance level in a default manner. Known methods of workload prediction may be used to arrive at a default performance level. In one example, this may involve an embodiment wherein performance level controller 19 computes an average of the workloads in the workload data vector from pattern shift register 14, or computes a predicted workload as a weighted sum of the workloads in this workload data vector and selecting a performance level that is sufficient to carry out this workload in one sampling period.

In an embodiment wherein pattern memory 16 is dynamically updated, pattern matching unit 18 may copy the current workload data vector from pattern shift register 12 to define a new reference workload data vector in a free location of pattern memory 16 if pattern matching unit 18 has found no matching workload data vector in pattern memory 16. Various methods may be used to set the control information. In one embodiment, the control information for a reference workload data vector may be set according to the observed workload in the sampling period after the series of sampling periods of the current workload data vector. Subsequently the performance level indicated by the control information of a reference workload data vector is changed based on observed workloads when the reference workload data vector matches the current workload data vector. In one embodiment, the control information for a reference workload data vector is initialized to a value that corresponds to setting a maximum performance value. Subsequently the performance level indicated by the control information of a reference workload data vector is changed based on observed workloads when the reference workload data vector matches the current workload data vector.

As noted, in an alternative embodiment the functions of pattern shift register 14, pattern memory 16, pattern matching unit 18, and performance level controller 19 may be performed in processor 10 under control of a performance level setting task. In this embodiment hardware timer 12 may function as an interrupt timer for processor 10. In response to interrupts from hardware timer 12, processor transfers control to a program for executing the performance level setting task. This program resets an accumulated workload count after storing a quantized copy of previous value into a current workload data vector. The program subsequently searches for a matching workload data vector in a table in memory, the part of the memory that stores the table corresponding to pattern memory 16. If a matching workload data vector is found the program reads out the control information for the matching workload data vector and sets the next performance level according to this control information. In other embodiments, part, but not all, of the function of pattern shift register 14, pattern memory 16, pattern matching unit 18, and performance level controller 19 may be performed by separate circuits, the remaining part being performed by processor 10.

Figure 2:
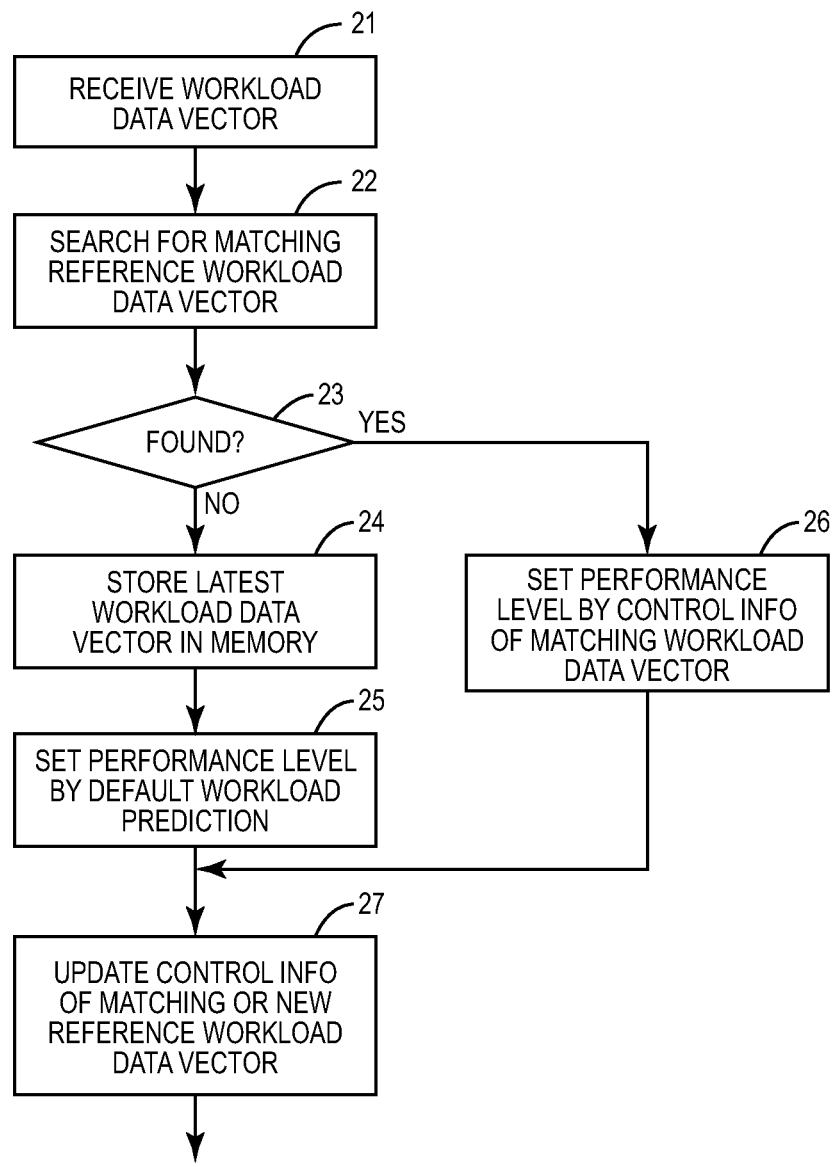
FIG. 2 shows a flow-chart of performance level control

FIG. 2 shows a flow-chart of performance level control. In a first step 21 pattern matching unit 18 or processor 10 receives a current workload data vector of quantized workload counts for a series of sampling periods preceding the current time point. In a second step 22 pattern matching unit 18 or processor 10 searches for a matching reference workload data vector. A third step 23 a test is executed whether a matching workload data vector has been found. If not, a fourth step 24 is executed wherein the latest workload data vector is optionally stored in pattern memory 16. This is followed by a fifth step 25 wherein a default prediction of the workload is computed and used to set the performance level. If third step 23 indicates that a match has been found a sixth step 26 is executed, wherein the control information of the matching workload data vector is read out and used to set the performance level.

After fifth step 25 and sixth step 26 a seventh step 27 is executed to update the control information of a previously matching reference workload data vector, if any, that matched the workload data vector of a preceding sampling period or was copied as new reference workload data vector from the current data vector of that preceding data period. The sampling periods may notionally be labelled with successive integer values. If the current sampling period has label n, its current workload data vector comprises workload data W(n), W(n−1), . . . W(n+1−N) for sampling periods n, n−1, . . . n+1−N. Herein N is the number sampling periods for which workload data is included in the work load data vector. In seventh step 27, the control information of the previously matching reference workload data vector that matched in sampling period n−1 is updated, i.e. the reference vector that matched with the workload data vector with data for sampling periods n−1, n−2, . . . n−N.

In an embodiment, seventh step 27 comprises storing an indication A(n) of the matching reference workload vector of the current sampling period for future use. In this case seventh step 27 comprises retrieving an indication A(n−1) of the previously matching reference workload data vector that was stored in a previous execution of the flow chart for a previous sampling period (n−1).

The current workload data vector for the current sampling period (n) contains workload data W(n) for the current sampling period (n) that follows the series of sampling periods n−1, n−2, . . . n−N with workload data that matched the previously matching reference workload data vector.

Figure 3:
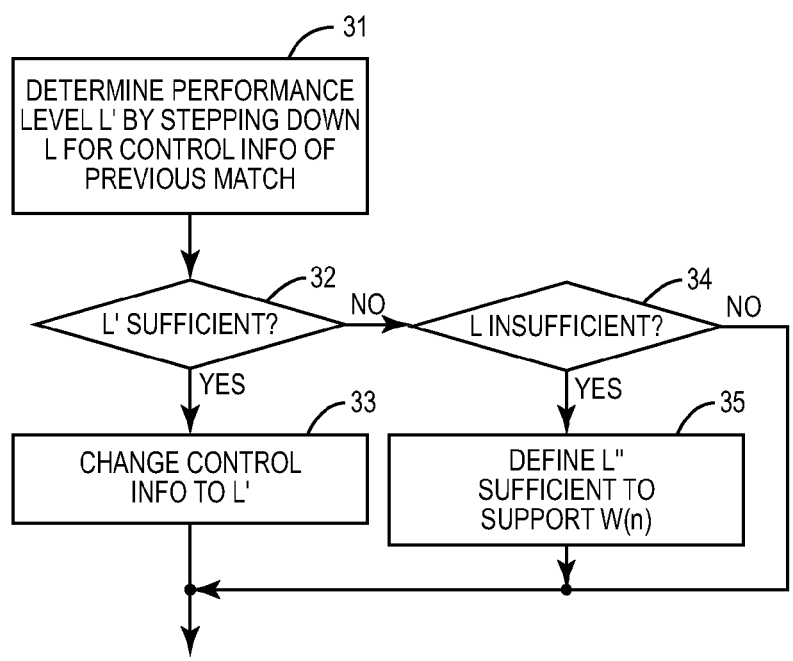
FIG. 3 shows a flow-chart of adjustment of control information

FIG. 3 shows a detailed flow-chart of an embodiment of sub-steps comprised seventh step 27. In a first sub-step 31 pattern matching unit 18 or processor 10 determines a trial performance level L' resulting from changing the control information C(x) that is combined with the previously matching reference workload data vector (labelled x), to step the performance level L(C(x)) down by a predetermined step. In a second sub-step 32 it is tested whether, the resulting trial performance level L' is still sufficient to support the workload indicated by the workload data W(n) obtained for the current sampling period (n). Thus for example, if the performance level L' defines a processor clock frequency f, it may be tested whether that frequency is sufficiently high to execute a number of instructions indicated by the observed workload W(n) in a the duration T of a sampling period. Steps of 50 Mhz in the clock frequency may be used for example. If second sub-step 32 indicates that the performance level can be stepped down, a third sub-step 33 is executed to change this control information C(x) for the previously matching workload data vector x accordingly.

In this embodiment the step is limited to a step between adjacent ones of a plurality of predetermined performance levels, e.g. at clock frequencies spaced at predetermined distances (e.g. 50 Mhz) from each other, up to a maximum clock frequency (e.g. 350 Mhz). Alternatively, a step may be used that steps at once to the lowest performance level that is still sufficient to support the workload indicated by the workload data W(n). This latter step may be larger than the step between adjacent predetermined performance levels, so that a faster convergence is realized. However, using steps between adjacent levels, for example in 50 Mhz clock frequency steps, has been found to have the advantage that a more stable adjustment of the control information is realized.

If second sub-step 32 indicates that the performance level cannot be stepped down, a fourth sub-step 34 is executed to test whether the performance level L(C(x)) defined by the control information C(x) of the previously matching workload data vector x already indicates a performance level that is insufficient to support the workload data Wen) obtained for the current sampling period (n). If so, a fifth sub-step 35 is executed to change the control information C(x) of the previously matching workload data vector x to define a performance level L" that is at least as high as needed to support the observed work load Wen). Otherwise, the control information may be left unchanged.

Figure 4:
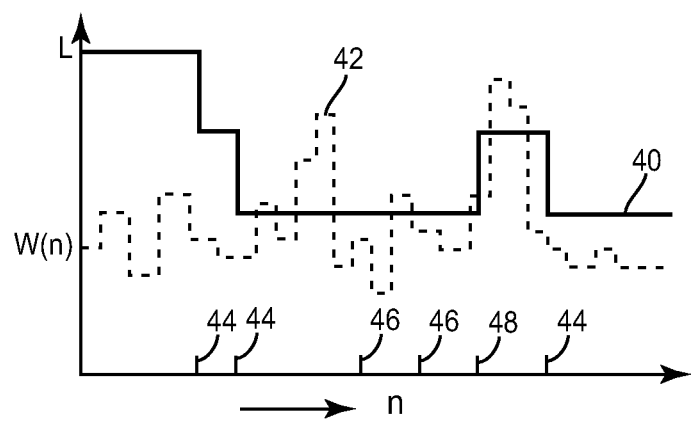
FIG. 4 shows a graph of performance levels

FIG. 4 shows an example of a graph 40 of performance levels defined in this way for a reference workload data vector, as a function of time in the form of sampling period number n. A number of time points 44, 46, 48 is indicated wherein the reference workload data vector has previously matched. As can be seen the performance level L is changed only at some of these time points. In addition a graph 42 of observed workloads Wen) is shown as a dashed line, on a scale comparable to the performance levels, in the sense that a workload above a level indicates that processor cannot support the workload at that level.

As can be seen the performance level defined for a reference workload data vector is changed only at some of the time points 44, 46, 48 where the reference workload data vector has matched. At time points 44, where the observed workload can be supported with one of a plurality of predetermined a performance levels lower than the previous performance level for the reference workload data vector, the performance level is lowered. At time points 48, where the observed workload cannot be supported with the previous performance level for the reference workload data vector, the performance is increased to one of the plurality of predetermined a performance levels that is high enough to support the observed workload. It may be noted that at such time points 48 execution of a task in processor 10 may have involved a failure to meet a real-time deadline, because a task was executed at an insufficient performance level. At remaining time points 46 where the reference workload data vector has matched the performance level is not changed.

When a new reference workload data vector is stored in pattern memory 16 it may initially be combined with control information that defines a maximum performance level. The changes of the control information ensure that this performance level will be reduced appropriately.

In other embodiments matching unit 18 may use other schemes to adjust the control information. In one embodiment the control information is set according to the observed workload in a first sampling period after a reference workload data vector has been copied from a current workload data vector. The control information may be set to select a performance level from a set of predetermined performance levels, so that the selected performance level is the lowest of the predetermined performance levels that supports the observed workload.

In a further embodiment, the control information for a reference workload data vector may be kept constant afterwards. In another further embodiment the control information for a reference workload data vector may be updated subsequently dependent on observed workload in sampling periods after the sampling periods in which the reference workload data vector matches a current workload data vector.

Figure 5:
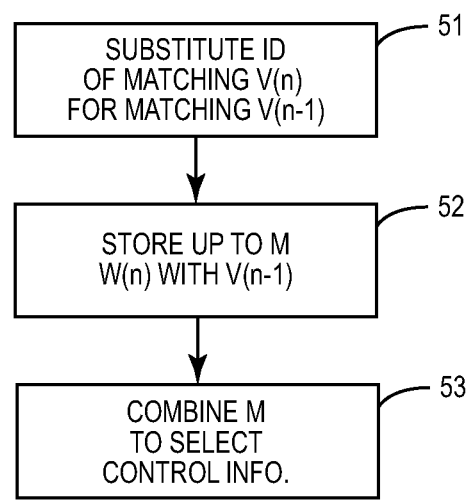
FIG. 5 shows one embodiment of one step of the performance level control method of FIG. 2.

FIG. 5 shows an embodiment of seventh step 27 wherein matching unit 18 keeps subsequent workload data for a plurality of previous instances in which a reference workload data vector has matched. In a first sub-step 51 matching unit 18 (or processor 10, if matching unit is implemented using a computer program of processor 10) retrieves data from a storage location that stores an identification of a matching reference workload data vector V(n−1) that matched in a preceding sampling period (n−1). Subsequently an identification of the reference workload data vector V(n) that matched in the current sampling period is stored in that storage location. In a second sub-step 52 the observed workload data W(n) of the current sampling period is obtained and stored in combination with the reference workload data vector V(n−1) that matched in the preceding sampling period. A plurality of M such workload data items may be stored for each reference workload data vector (M=4 for example), obtained for the M most recent sampling periods wherein the reference workload data vector matched the current workload data vector.

In a third sub-step 53 these M workload data values (or fewer, if fewer have yet been stored) are read out and combined to select the control information. In an embodiment this may involve selecting the maximum workload represented among the M workload data values, selecting the lowest one of a plurality of predetermined performance levels that supports this maximum workload and setting the control information to obtain this selected performance level. In another embodiment a median value of the M values may be used instead of the maximum, or a value at a predetermined rank in order of workload of the M values (e.g. the second highest). In another embodiment an average of the M values may be used instead of the maximum. In this way unstable adjustment of the performance level due to exceptional workloads can be prevented.

Although embodiments have been shown wherein the workload data in the workload data vectors comprises counts of executed instructions in respective sampling periods, it should be realized that in other embodiments other data may be included in the vectors, such as a count of instances at which predefined points in program are reached during a sampling period, a count of memory accesses during a sampling period, a count of use of other resources etc. In each case, such data is directly or indirectly indicative of workload that must be supported by the performance level.

Although embodiments have been shown wherein the control information for each reference workload data vector is changed immediately once the workload data for a sampling period following a match reference workload data vector has be detected, it should be appreciated that the control information may be changed at a later time dependent on the observed workload data. This workload data remains available at least as long as it shifts through the current workload vector. The workload data for the update of the control information may also be stored outside pattern shift register 14, in which case an arbitrary time point may be selected for updating the control information.

A pattern memory 16 with space for any number of reference workload data vectors may be used. The only limit is that it should be possible to detect a matching reference workload data vector before it is necessary to update the performance level under control of the control information for the matching reference workload data vector. This limitation may be made less stringent by combining reference workload data vectors with control information for further distant sampling periods. In the previous embodiments, a current vector of workloads W(n), W(n−1), . . . , wherein the indices n, n−1, . . . indicate successive sampling periods was matched with reference workload data vectors to set the performance level for the immediately following sampling period n+1. In an alternative embodiment, configuration controller 19 may be configured to use a match with a workloads data vector for sampling periods n, n−1 . . . to set the performance level for a sampling period n+2 following the immediately following sampling period, or even further sampling periods n+m, where m exceeds two. This has the advantage that more time is available for matching. On the other hand using the immediately following sampling period has the advantage that a higher correlation between the workload in that sampling period and the reference workload data vector is realized, which results in more efficient execution and less errors.

In an embodiment matching unit 18 is configured to use a matching result for at least one preceding sampling period to speed up matching. Reference workload data vectors may be related by the fact that a first vector can be obtained by shifting a second vector and adding a new workload, i.e. if the second reference vector has workload data W(0), W(1) . . . and the first reference vector has workloads Q, W(0), W(1) . . . In an embodiment, matching may be sped up if matching unit 18 is configured to test first whether first reference vector matches in a sampling period after the second reference vector matched in a preceding reference period. In another embodiment matching unit 18 may be configured to compute partial matching scores beforehand. Thus, in order to detect whether a reference workload data vector matches in a sampling period n, an earlier part of the components of the reference workload data vectors may already be matched in an earlier sampling period n-1, or n-2 etc.

In the preceding embodiments preferably only hard matches are detected, wherein all components of the matching reference workload data vector are exactly equal to the corresponding components of the current workload data vector. In this type of embodiment effects of fluctuations in the workload may be suppressed by quantizing workload counts to form the workload data before matching.

In alternative embodiments a softer form of matching may be used, for example by detecting a match on condition that no component of the matching reference workload data vector differs by more than a threshold distance from the corresponding component of the current workload data vector. In an embodiment the distance threshold may correspond to a difference between successive quantization levels. In another embodiment a larger distance threshold or thresholds may be used. As another example the condition may be that the sum of the absolute differences between components of the matching reference workload data vector and corresponding components of the current workload data vector is less than a threshold. In other embodiments other matching criteria may be used. In such soft matching criteria decreasing weights may be assigned to workload data for increasingly earlier sampling period. Thus for example, the thresholds distances for different component may increase for increasingly earlier sampling periods.

As described these functions may be performed by a controller 19, a pattern matching unit 18 and shift register 12 implemented by means of a programmable computer in combination with a computer program to perform the functions as described. Processor 10 may be part of this programmable computer and it may execute the program as one of its tasks. Alternatively, hardware specifically designed to perform part or all of these functions may be used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:
1. A data processing device, comprising:
a processing circuit operable at selectable ones of a plurality of performance levels, each performance level comprising a combination of power supply voltage and clock frequency, and configured to provide a supply of workload data indicating a workload of the processing circuit over a sampling period;

a shift register circuit, operative to successively shift and store a predetermined number (N) of samples of workload data from the processing circuit over N corresponding successive sampling periods to generate a current workload data vector;

a pattern memory circuit, operative to store control information to control a performance level of the processing circuit in combination with a plurality of reference workload data vectors, each reference workload data vector containing workload data for N successive sampling periods;

a pattern matching circuit configured to compare a current workload data vector to the plurality of reference workload data vectors and to detect a match; and a performance level control circuit, configured to select a performance level of the processing circuit, based on the control information that is stored in combination with the matching workload data vector for at least the next sampling period.

2. A data processing device according to claim 1, wherein the pattern matching circuit is configured to update the control information for the matching reference workload data vector in the pattern memory circuit based on subsequent workload data from the processing circuit in the next sampling period.

3. A data processing device according to claim 2, wherein the pattern matching circuit is configured to store an indication of each time (i) the same reference workload data vector matches a new current workload data vector, and to store workload data W(i) from the processing circuit for the next sampling period following each such reference workload data vector match, and wherein updating the control information for the matching reference workload date vector in the pattern memory circuit comprises the control information based on all such stored workload data W(i).

4. A data processing device according to claim 3, wherein the pattern matching circuit is configured to determine a maximum workload indicated by the respective workload data W(i) for the plurality of previous sampling periods and to update the control information based on the maximum workload.

5. A data processing device according to claim 2, wherein the pattern matching circuit is configured to lower the performance level indicated by the control information to a lowered performance level when the lowered performance level is sufficient to support the workload represented by the subsequent workload data.

6. A data processing device according to claim 5, wherein the pattern matching circuit is configured to lower the performance level by a step between adjacent ones of a plurality of predetermined selectable performance levels, when the lowered performance level is sufficient to support the workload represented by the subsequent workload data, irrespective of whether the performance level after the step is higher than a lowest one of the predetermined performance levels that supports the workload represented by the subsequent workload data.

7. A data processing device according to claim 2, wherein the pattern matching circuit is configured to raise the performance level indicated by the control information to a lowest one of a plurality of predetermined performance levels that supports the workload represented by the subsequent workload data, when the performance level indicated by the control information is insufficient to support the workload represented by the subsequent workload data.

8. A data processing device according to claim 1, wherein the pattern matching circuit is configured to add to the pattern memory circuit the current workload data vector as a new reference workload data vector in response to detection that the received workload data vector does not match any of previously stored reference workload data vector in the pattern memory circuit.

9. A data processing device according to claim 1, comprising a quantizing circuit configured to quantize workload counts from the processing circuit to form the workload data before matching.

10. A data processing device according to claim 1, wherein the processing circuit is configured to determine the workload data by counting instructions executed by the processing circuit to perform one or more tasks during the sampling periods except for instructions during idling.

11. A data processing device according to claim 1, wherein the processing circuit is configured to determine the workload data by selectively counting memory access instructions executed by the processing circuit to perform one or more tasks during the sampling periods.

12. A method of executing tasks on a processing circuit, wherein the processing circuit is operable at selectable ones of a plurality of performance levels, each performance level comprising a combination of power supply voltage and clock frequency, the method comprising:

determining workload data indicating a workload of the processing circuit over a sampling period, the workload data comprising at least one of a count of non-idle instructions executed during the sampling period and a count of memory accesses performed during the sampling period;

successively shifting and storing a predetermined number (N) samples of workload data from the processing circuit over N corresponding successive sampling periods to generate a current workload data vector;

comparing the current workload data vector to a plurality of reference workload data vectors, to detect a match, wherein each reference workload data vector is stored in combination with control information; and setting the performance level of the processing circuit based on the control information that is stored in combination with the matching workload data vector.

13. A non-transitory computer readable medium containing a computer program product comprising a program of instructions for setting a performance level of a processing circuit that is operable at selectable ones of a plurality of performance levels, each performance level comprising a combination of power supply voltage and clock frequency, which program, when executed by a programmable computer, causes the computer to determine workload data indicating a workload of the processing circuit over a sampling period, the workload data comprising at least one of a count of non-idle instructions executed during the sampling period and a count of memory accesses performed during the sampling period;

successively shift and store a predetermined number (N) samples of workload data from the processing circuit over N corresponding successive sampling periods to generate a current workload data vector;

compare the current workload data vector to a plurality of reference workload data vectors, to detect a match, wherein each reference workload data vector is stored in combination with control information; and set the performance level of the processing circuit based on the control information that is stored in combination with the matching workload data vector.

14. A data processing device according to claim 3, wherein updating the control information based on all such stored workload data $W(i)$ comprises updating the control information to specify a performance level sufficient to support the maximum of all such stored workload data $W(i)$.

15. A data processing device according to claim 3, wherein updating the control information based on all such stored workload data $W(i)$ comprises updating the control information to specify a performance level sufficient to support the median value of all such stored workload data $W(i)$.

16. A data processing device according to claim 3, wherein updating the control information based on all such stored workload data $W(i)$ comprises updating the control information to specify a performance level sufficient to support the average value of all such stored workload data $W(i)$.

17. A data processing device according to claim 1, wherein N=8.

18. A data processing device according to claim 8, further comprising storing in the pattern memory circuit, in combination with the new reference workload data vector, control information to control a performance level of the processing circuit based on subsequent workload data from the processing circuit in the next sampling period.

19. A data processing device according to claim 8, further comprising storing in the pattern memory circuit, in combination with the new reference workload data vector, control information to control a performance level of the processing circuit to be a maximum performance level.

* * * * *